United States Patent [19]

Palmatier et al.

[11] 4,187,435

[45] Feb. 5, 1980

[54] APPARATUS FOR DETERMINING IMAGE AREAS FOR PRINTING WITH CORRECTION FOR EXTRANEOUS MATTER

[75] Inventors: Roland T. Palmatier, Westerly, R.I.; Francis J. Sciulli, Palm Bay, Fla.

[73] Assignee: Harris Corporation, Cleveland, Ohio

[21] Appl. No.: 913,520

[22] Filed: Jun. 7, 1978

[51] Int. Cl.[2] .............. G01N 21/30

[52] U.S. Cl. .............. 250/559; 356/444

[58] Field of Search .............. 250/559, 562, 563, 571, 250/572, 214 R, 214 C; 356/432, 433, 434, 435, 444, 443

[56] References Cited

U.S. PATENT DOCUMENTS

| | | | |
|---|---|---|---|
| 3,741,664 | 6/1973 | Torin | 356/444 |
| 3,790,275 | 2/1974 | Huboi et al. | 356/435 |
| 3,853,409 | 12/1974 | Gaillochet | 356/432 |
| 3,958,509 | 5/1976 | Murray et al. | 250/559 |
| 4,100,424 | 7/1978 | Akimoto et al. | 356/443 |

*Primary Examiner*—David C. Nelms

[57] ABSTRACT

Apparatus for analyzing an image member such as a photographic film bearing an image to be printed and providing information as to the image area. The information may be utilized in determining initial ink key settings for a printing cylinder on which the image is to be printed. The image member is positioned on a support surface and a scanner assembly including a light source and light sensors scans the surface. Light transmission readings are taken from calibration film strips on the support surface and at positions on the support surface corresponding to the locations of the ink key columns of the printing cylinder. The data are calibrated and normalized using the calibration readings. The data are also corrected for the number of layers in the image member. Data from ink key columns which will not be utilized in printing the image analyzed are discarded. A procedure is provided for removing the effect on the data of any non-image material on the image member.

6 Claims, 15 Drawing Figures

TO FIG. 9C TO FIG. 9B

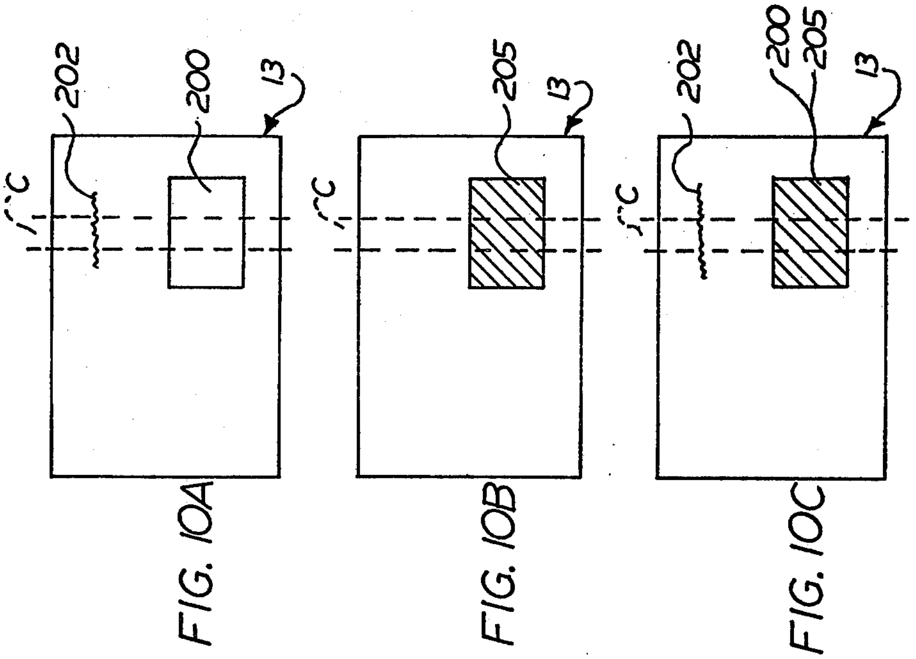
FIG. 10A
FIG. 10B
FIG. 10C
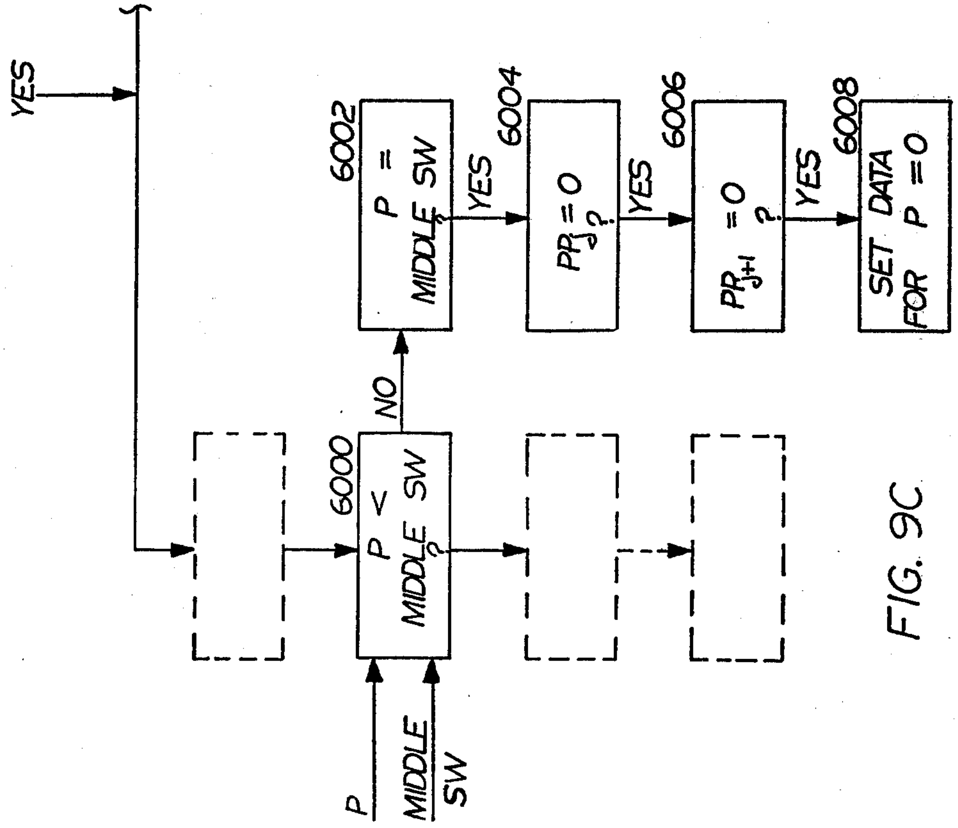
FIG. 9C

APPARATUS FOR DETERMINING IMAGE AREAS FOR PRINTING WITH CORRECTION FOR EXTRANEOUS MATTER

TECHNICAL FIELD AND BACKGROUND OF THE INVENTION

This invention relates to apparatus for providing information for use in determining the ink requirements of a printing cylinder. More particularly, the invention is directed to a system for analyzing a member such as a photographic film bearing an image to be printed by the cylinder and providing information as to the image area.

In offset printing, the thickness of a film of ink applied to a printing cylinder is controlled by regulating the quantity of ink in each of a plurality of adjacent columns along the surface of the cylinder. The quantity of ink in each column is controlled by a deformable metal blade which is positioned at each column closer to or farther from an inking roller by means of ink keys such as screws or other regulating means for each column. In some cases, each column may be supplied with ink by a piston pump which is controlled to vary the amount of ink supplied to the column. The amount of ink supplied may be adjusted by observing the printed product to determine in which columns there is too much or not enough ink and adjusting the ink keys, such as the positions of the screws, accordingly. An initial adjustment may be made by observing the image area to be printed in each column and adjusting the ink key for that column accordingly.

In U.S. Pat. No. 3,853,409 there is disclosed a system for obtaining information on the ink requirements of a printing cylinder by determining the amount of light transmitted through a photographic film of the image to be printed at each column thereof. The film may be either a positive or negative of the image to be printed. The surface to be printed is directly proportional to the dark area of the film for a positive or to the clar area for a negative. The film to be analyzed is placed between a stationary light source and a battery of photoelectric cells, one cell of large size for each column to be analyzed. The output information from the various cells may be viewed on a CRT to develop the initial ink key setting and/or may be recorded in digital form.

Although the system disclosed in U.S. Pat. No. 3,853,409 provides significant advantages over prior means for obtaining information for initial ink key settings, it requires a significant amount of manual intervention.

In U.S. Pat. No. 3,958,509 there is disclosed a system for determining initial ink key settings of a printing press in which a printing plate is imaged onto an electronic camera tube and scanned. The system requires access to the printing plate and is inconvenient for that reason.

BRIEF SUMMARY OF INVENTION

According to the present invention, there is provided a system in which a scanner assembly is moved across an image bearing member such as a photographic film on a transparent support surface. The scanner assembly includes a single elongated light source and collimator on one side of the transparent surface and a light sensor head on the other. The sensor head includes a columnar array of light sensors. The transparent planar surface represents a developed printing cylinder divisible into a plurality of adjacent ink key columns. At each end of the transparent surface there is provided a calibration area including a column of the unoccupied transparent support surface and means for receiving a column of unimaged or base film and a column of fully imaged or opaque film of the type to be analyzed.

Control panel switches are provided for entering the page positions to be printed for the film being analyzed, the number of film layers, whether a positive or negative and the width of the web on which the image is to be printed. An arrangement is also included for providing information as to the location of the scanner assembly across the support surface.

The scanner assembly is moved across the table and the output of each light sensor is automatically sampled twice at each ink key column (or, once for each ink key half column) and at each calibration column at the beginning of the scan.

The light transmission samples are calibrated and scaled using the calibration data and adjusted for the number of film layers and whether the film is a negative or positive. Data for ink key half columns which are not in the page positions to be printed or are outside the web width to be employed are discarded. The selected page positions and web width are determined from the control panel switches. The calibrated and scaled data samples for each column to be printed are then summed to yield image area information for that column. The image area values may be stored and provided later as inputs to apparatus for determining and making initial ink key settings.

Provision is also made for "burn out" or correcting of image area information to delete the effect of extraneous matter such as writing or the like on a positive film. The image area values for such a film are stored in the usual manner. The "burn out" procedure is then selected by pushbutton on the control panel. The positive film is replaced on the support surface with an opaque mask corresponding to the image material but not the extraneous material and a second scan is made. The positive is then placed over the mask, the "burn out" function is again selected and a third scan is made. The system will, for each column, automatically subtract the absolute value of the image area values obtained from the second scan from the absolute value of the area values obtained from the third scan and subtract that difference from the values obtained from the first scan. As a result, the values obtained from the first scan are corrected for each column to delete the effect of the extraneous material on the image area information.

BRIEF DESCRIPTION OF THE DRAWINGS

FIGS. 9A to 9C are a flow chart of the operation of a microprocessor in determining the ink key half columns in non-selected page positions and deleting the data for those columns;

FIGS. 10A to 10C are diagrams illustrating the procedure for deleting the effect of non-image material present on a positive film image from the image area values.

DETAILED DESCRIPTION OF INVENTION

Figure 1:
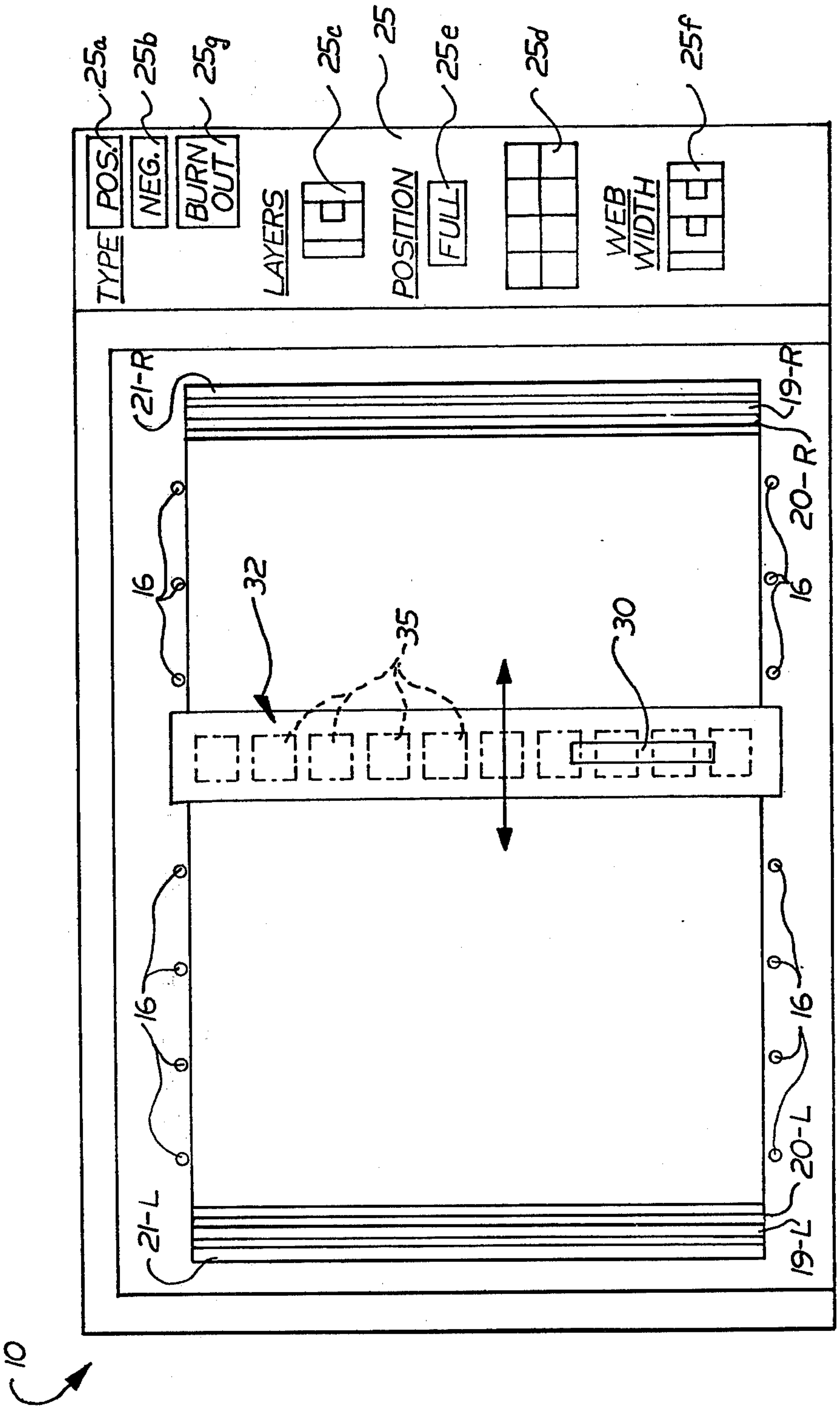
FIG. 1 is a plan view of image-analyzing apparatus embodying the present invention.
Figure 2:
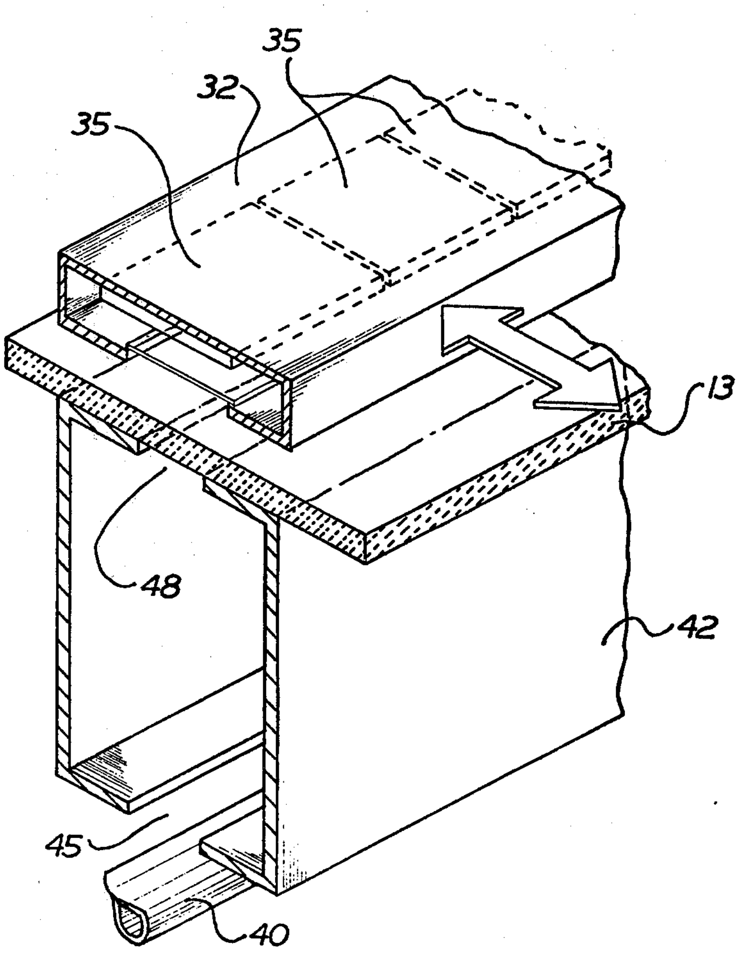
FIG. 2 is a perspective view of a scanner assembly employed in this invention.
Figure 3:
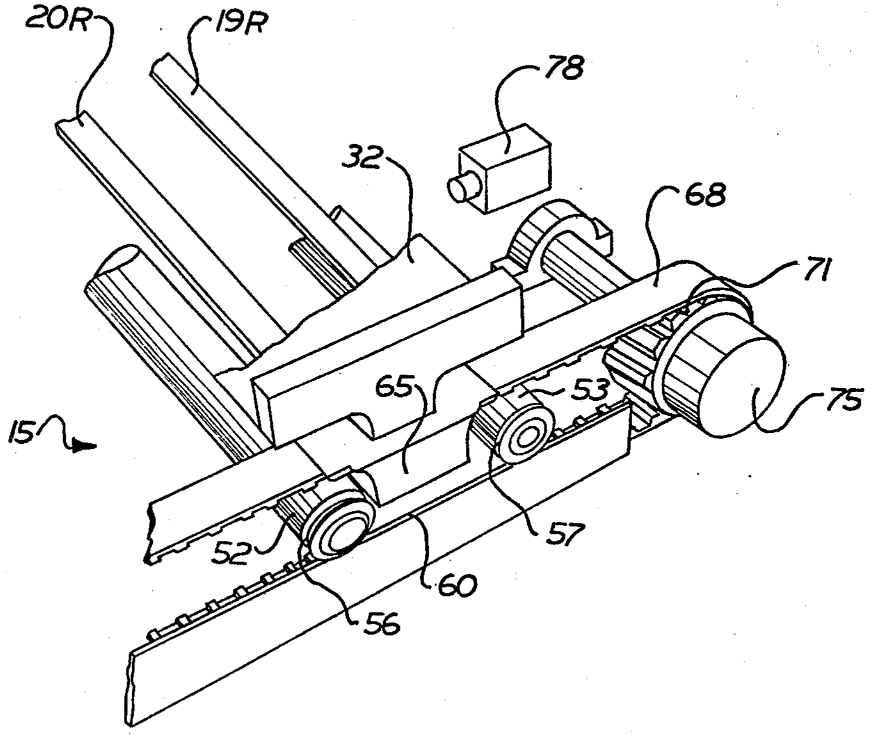
FIG. 3 is a perspective view showing the mounting arrangement for the scanner assembly.

Referring initially to FIGS. 1 to 3, a control console 10 supports a transparent, preferably glass, image member supporting surface 13 and a scanner assembly generally designated 15. An image member such as a photographic film may be positioned on all or a part of support surface 13 by means of pins 16 which pass through holes in the edges of the film. The film bears a photographic image, negative or positive, corresponding to an image to be printed. On support surface 13, the film will be analyzed to determine the area of the image in imaginary columns corresponding to the ink key columns of a printing cylinder to which the ink supply is controlled for printing purposes.

At each end of surface 13 there is provided a pair of film strip holders 19L, 20L and 19R, 20R for the left and right pairs of holders, respectively. Each holder receives a strip of film of the same type as being analyzed, holders 19L and 19R each receiving a strip having no image thereon while holders 20L and 20R receive strips which are fully imaged or opaque. These strips are provided for calibrating and normalizing data from the imaged film as will be explained more fully below. A clear, uncovered column of transparent support surface 13 is provided outside each strip 19L, 19R also for calibration purposes and identified as 21L, 21R.

Console 10 includes a control panel 25 having a number of push button switches thereon by which an operator may provide information for aid in analyzing data from a film. The information includes the film type, positive or negative from switches 25*a*, 25*b*, the number of layers of film, 1 to 9, from a thumb wheel switch 25*c*, information as to the page positions on which the film image is to be printed and information as to the width of web to be employed in the printing of the image. The page position information is entered by means of a group of switches 25*d* which indicate the page positions on the film having an image to be printed and a switch 25*e* which indicates that all page positions of the film are to be printed. Web width may be set to the nearest inch by thumbwheel switches 25*f*. The final button, 25*g*, on control panel 25 is labeled "burn out" and selects a procedure whereby the effect of extraneous non-image information such as writing on a positive film may be deleted from the film data so as not to affect the image area information.

The scanner assembly 15 is manually movable with respect to the support surface 13 and the film thereon by means of a handle 30. The scanner assembly includes a sensor head 32 supported above the surface of support surface 13 and having a column of light sensors 35. Each sensor 35 provides an output signal proportional to the amount of light incident thereon. Supported below sensor head 32 and beneath the plane of support surface 13 is a light source 40 (FIG. 2), preferably a single elongated fluorescent bulb, and a collimating shroud 42. Shroud 42 includes a source aperture 45 at its lower end and an illumination aperture 48 at its upper end. The shroud collimates the light from bulb 40. The illumination aperture 48 confines the light provided through transparent support surface 13 to sensors 35 to a desired width.

As shown in FIG. 3, scanner assembly 1 is supported in console housing 10 by rollers 52, 53 having slots 56, 57 which ride on a track 60. The scanner assembly is secured by means of a clamping arrangement 65 to a toothed belt 68 supported by pulleys at each end of support surface 13, only one such pulley 71 being shown. A position potentiometer 75 is mounted with pulley 71 so that its shaft is rotated by movement of belt 68 whenever scanner assembly 15 is moved with respect to support surface 13. The arrangement of potentiometer 75 and belt 68 is calibrated so that potentiometer 75 provides an output signal of 0 volts when scanner assembly 15 is at one limit of travel or home position with respect to surface 13 and provides a maximum output voltage when the scanner assembly is at its opposite limit of travel. A scan switch 78 is positioned at each limit of travel of scanner assembly 15 to be operated thereby and provide a signal indicating that the scanner assembly is at one or the other home position or in a scan position on support surface 13.

The apparatus of FIGS. 1 to 3 is operated by positioning a film to be analyzed on support surface 13 and entering the appropriate information on control panel 25. The scanner assembly 15 is then moved manually by means of handle 30 from its limit of travel at one side of support surface 13 to its opposite limit of travel. As the assembly is moved across surface 13 light is transmitted from bulb 40 to the respective light sensors 35 through transparent support surface 13 alone at some areas and through the support surface and either the calibration strips or an imaged film at other areas. Each sensor provides an output signal proportional to the amount of light received which is sampled at predetermined positions in the travel of the scanner assembly. The output of each sensor is sampled at the beginning of travel of the scanner assembly at the calibration areas 21L or R, 19L or R, and 20L or R. These calibration samples are used to calibrate and normalize the data subsequently taken from the imaged film. Data samples are taken at positions on support surface 13 corresponding to the ink key columns of a printing cylinder.

Figure 4:
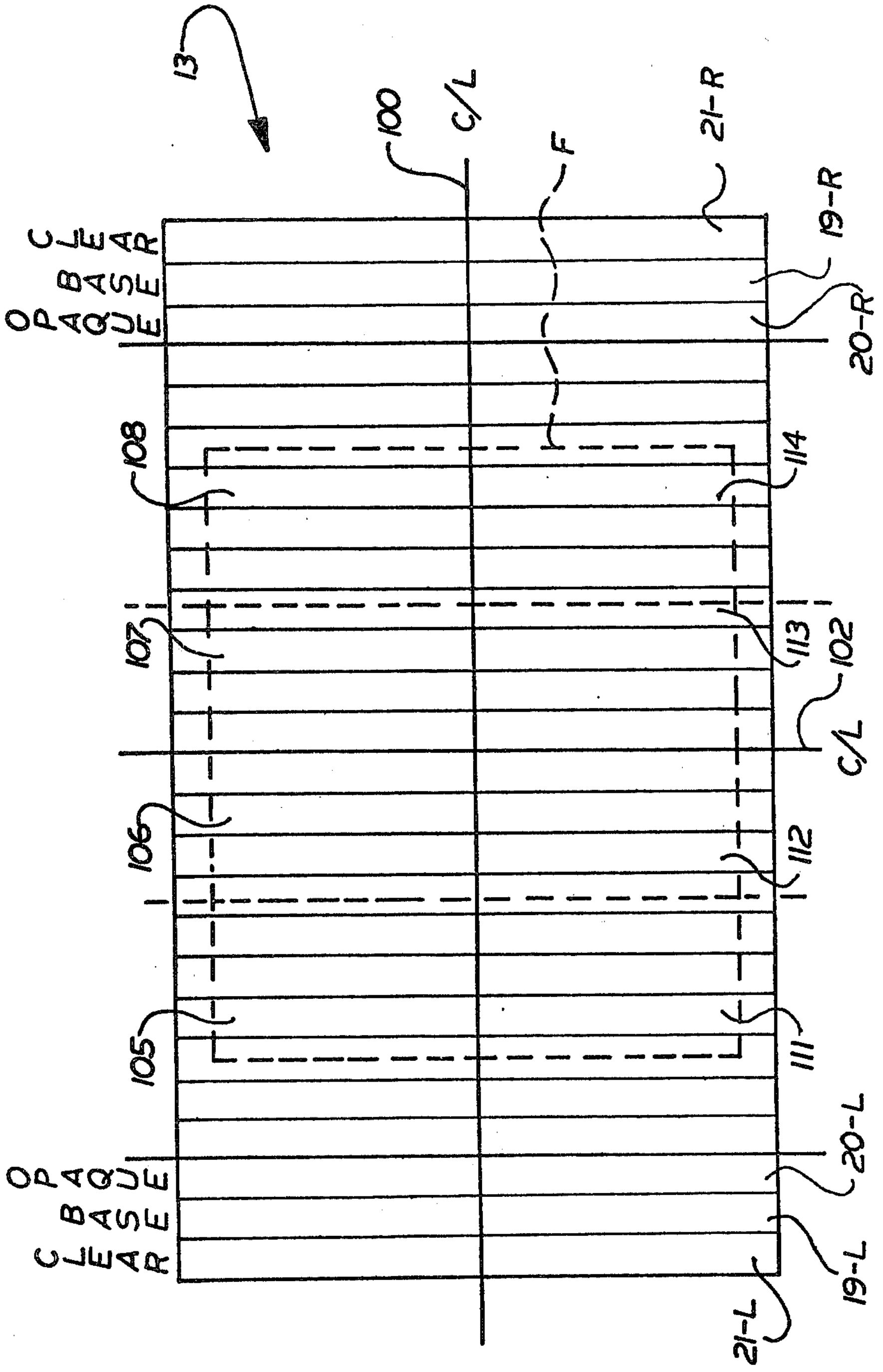
FIG. 4 is a diagram of the image member support surface illustrating its divisibility into ink key columns.

As shown in FIG. 4, transparent support surface 13 is considered for purposes of analyzing imaged films positioned thereon to be a developed printing cylinder. The imaginary center line 100 corresponds to the longitudinal center line of the printing cylinder and the imaginary center line 102 corresponds to the transverse center line of the cylinder. Each of the upper and lower halves of support surface 13 represents one half of the circumference of the cylinder. The area on one side of center line 102, for example the left side, represents the so called "gear side" of the press and the opposite side represents the "work side".

Transparent support surface 13 is also considered to be divided into ink key columns corresponding to columns to which the flow of ink is controlled in a printing cylinder. The columns are positioned symmetrically on each side of the transverse center line 102 of support surface 13. In FIG. 4, 10 columns are shown on each side of center line 102. For purposes of identification and data acquisition the columns are divided into half columns and the half columns are numbered from left to right, from 1 to 40 in the example of FIG. 4. Outside of the respective outermost half columns 1 on the left and 40 on the right are the two calibration strip holders 19L, 20L, and 19R, 20R for base and opaque calibration readings and the clear calibration half columns 21L and 21R. Each of the base, opaque and clear calibration areas occupies a half column height and width, although shown wider in FIG. 4.

A film F is in place on support surface 13 at the position at which the images thereon will be printed on the press. The film F is considered to be divided into page positions 105 to 108 and 111 to 114. All or only some of the page positions may contain images to be printed and these are entered by means of push buttons **25*d* or 25*e***.

In operation, a film to be analyzed is placed on transparent support surface 13 at the position corresponding to the position at which the images thereon will be printed on the press. The page positions having images to be printed are then selected on the control panel by means of switches **25*d* or by "Full" switch 25*e*. The type of film, positive or negative, and number of layers and the web width are also set on the control panel 25. The scanner assembly 15 is then moved manually by means of handle 30 across the entire width of transparent support surface 13 from one limit of travel to the other. As the scanner assembly is moved across support surface 13, the output of each sensor 35 is sampled once at each calibration area 19L or R, 20L or R and 21L or R and is sampled once at each half column 1 to 40. A system for accomplishing the data sampling and operating on the data is shown in FIG. 5**.

Figure 5:
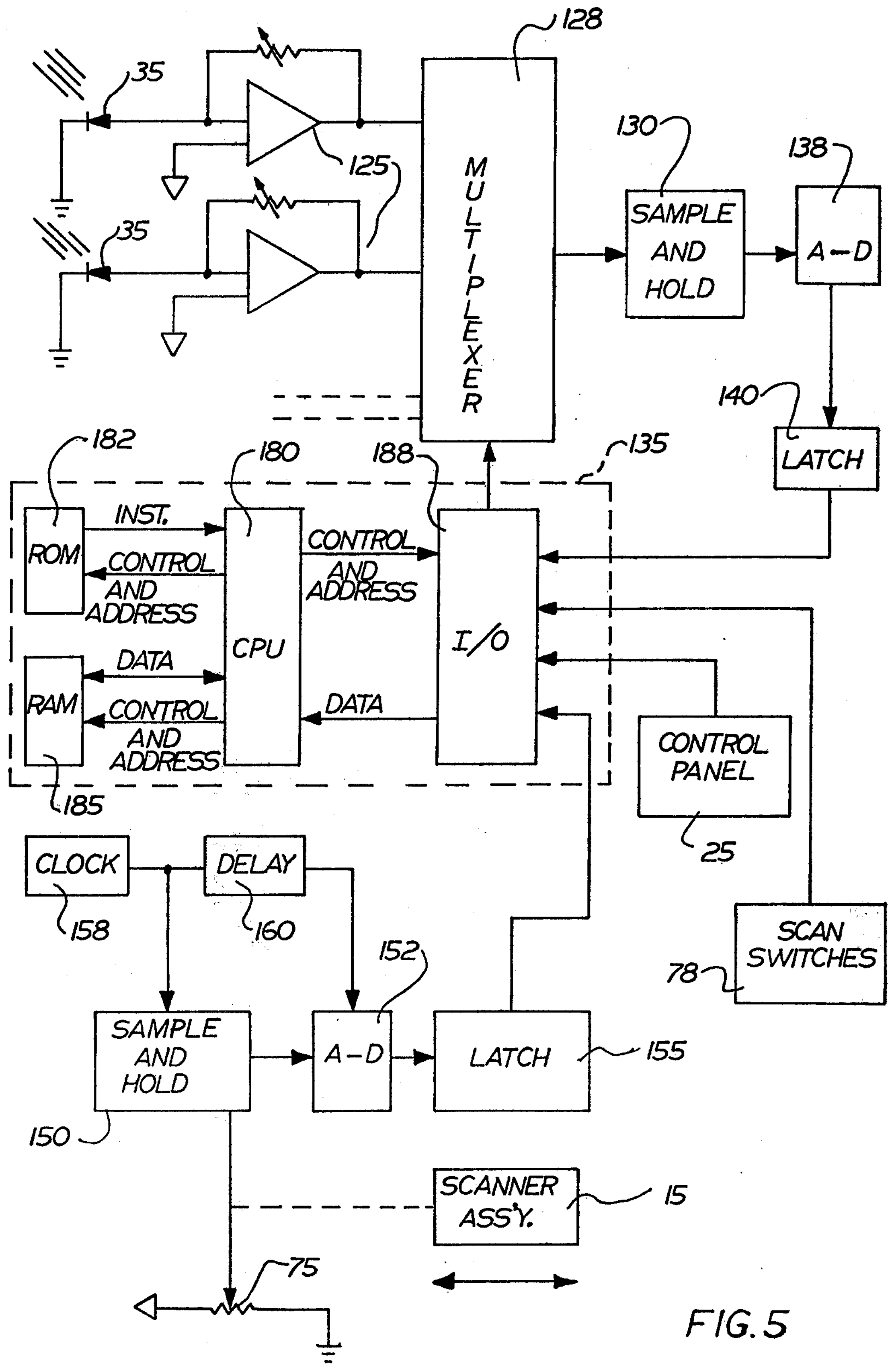
FIG. 5 is a block diagram of a system for obtaining light transmission samples at desired locations on the image member support surface and for treating the samples to obtain image area information for each ink key column.

As shown in FIG. 5, the output signals from sensors 35 are amplified in amplifiers 125 which are connected to the input of an analog multiplexer 128. The multiplexer connects the output of each amplifier 125 in turn to the input of a sample and hold circuit 130 upon receipt of a command from a controller 135. Each sample is converted to digital form in an A-D converter 138, temporarily stored in latch 140 and provided to controller 135 for further operation.

Controller 135 initiates a sampling sequence when scanner assembly 15 is at each of the calibration areas and initiates a sampling sequence at each of the half columns. Each sampling sequence is initiated by comparing information as to the position of scanner assembly 15 with positions stored by controller 135 at which data is to be taken. As scanner assembly 15 moves across support surface 13, position potentiometer 75 provides an analog signal indicative of the scanner assembly position to a sample and hold unit 150. The position sample is converted to digital form by an A-D converter 152 and provided to a latch 155. The analog position signal is sampled at intervals determined by pulses from a clock pulse generator 158 and converted to digital form after a short delay provided by delay circuit 160. The digital position information is available to controller 135 through latch 155. When the digital position information corresponds to a position stored by controller 135 at which data is to be taken, a sampling sequence is initiated by the controller and the data resulting therefrom are provided to controller 135.

Preferably the controller 135 incorporates a microprocessor system including a central processing unit or CPU 180, a read only memory (ROM) 182, a random access memory (RAM) 185 and an input-output (I/O) unit 188. The microprocessor system may be based on the INTEL Model 8080A CPU and related memory and I/O units. As is conventional, CPU 180 is controlled by microinstructions stored in memory 182 and operates on data stored in working memory 185 and which can be transferred back and forth between memory 185 and the CPU. Communication between the external devices such as control panel 25, data latch 140, position latch 155, and multiplexer 128 and the microprocessor system is through I/O unit 188. Data is transferred within the various components of the microprocessor system on a data bus as is well known in the art. The memories 182 and 185 are addressed and controlled from the CPU by means of control and address buses as is the I/O unit 188 through which the external devices are selected and controlled. The information from the external devices, such as data from data latch 140, is inputted through I/O unit 188 to the data bus.

Figure 6:
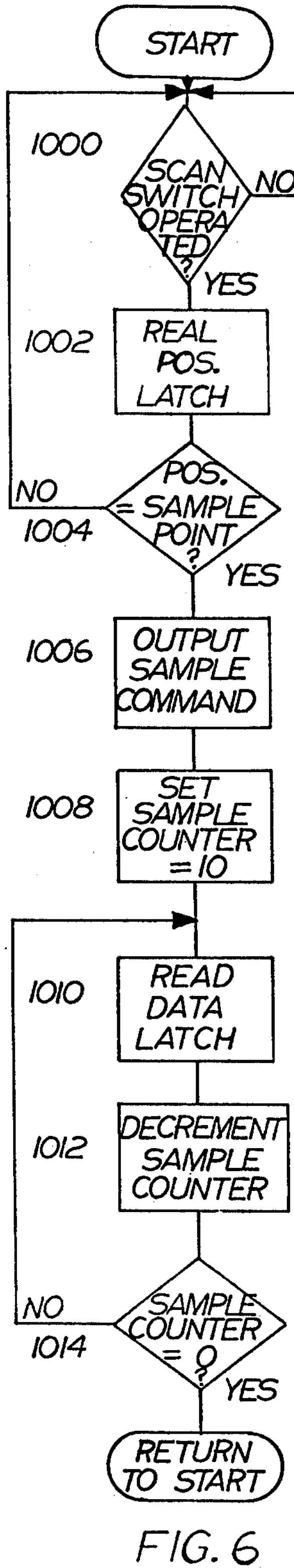
FIG. 6 is a flow chart of the operation of a microprocessor in controlling the obtaining of light transmission samples.

FIG. 6 illustrates a program sequence which may be followed by the microprocessor system to obtain light transmission data samples at predetermined positions across support surface 13. An explanation of the procedure at each step of the program sequence is set forth below.

| Instruction | Procedure |
|---|---|
| 1000 | This instruction invokes a procedure whereby the scan switches 78 are interrogated to determine if either is operated. If either scan switch is operated the scanner assembly is in a scan position. If neither scan switch is operated the microprocessor may turn to other tasks but periodically will return and interrogate the scan switches. |
| 1002 | This instruction invokes a procedure whereby the position latch 155 is read to determine the position of the scanner assembly on support surface 13. |
| 1004 | This instruction invokes a procedure whereby the position read from latch 155 is compared to positions stored in memory 185 at which samples are to be taken. If no equality is found the previous steps in the program are repeated until a match is obtained. |
| 1006 | This instruction invokes a procedure whereby a sample command is provided to multiplexer 128 to sample the output from each of the sensors 35. |
| 1008 | This instruction invokes a procedure whereby a sample counter is set to the number of sensors 35 to be sampled, which in this case is ten. |
| 1010 | This instruction invokes a procedure whereby data latch 140 is read and the light transmission data sample from the first sensor 35 is stored. |
| 1012 | This instruction invokes a |

-continued

| Instruction | Procedure |
|---|---|
| | procedure whereby the sample counter is counted down by one count. |
| 1014 | This instruction invokes a procedure whereby the sample counter is tested to determine if its contents are zero. If not, the sequence of reading the data latch and decrementing the sample counter is repeated until the content of the sample counter is zero. |

It will be apparent from the foregoing and from FIG. 6 that the above-described sequence will be continued until light transmission readings are taken from each sensor at each of a number of predetermined positions across support surface 13. Preferably, one sample is taken for each sensor at each of the clear, base and opaque half columns (FIG. 4) and one sample for each sensor at each of the ink key half columns 1 to 40.

Figure 7:
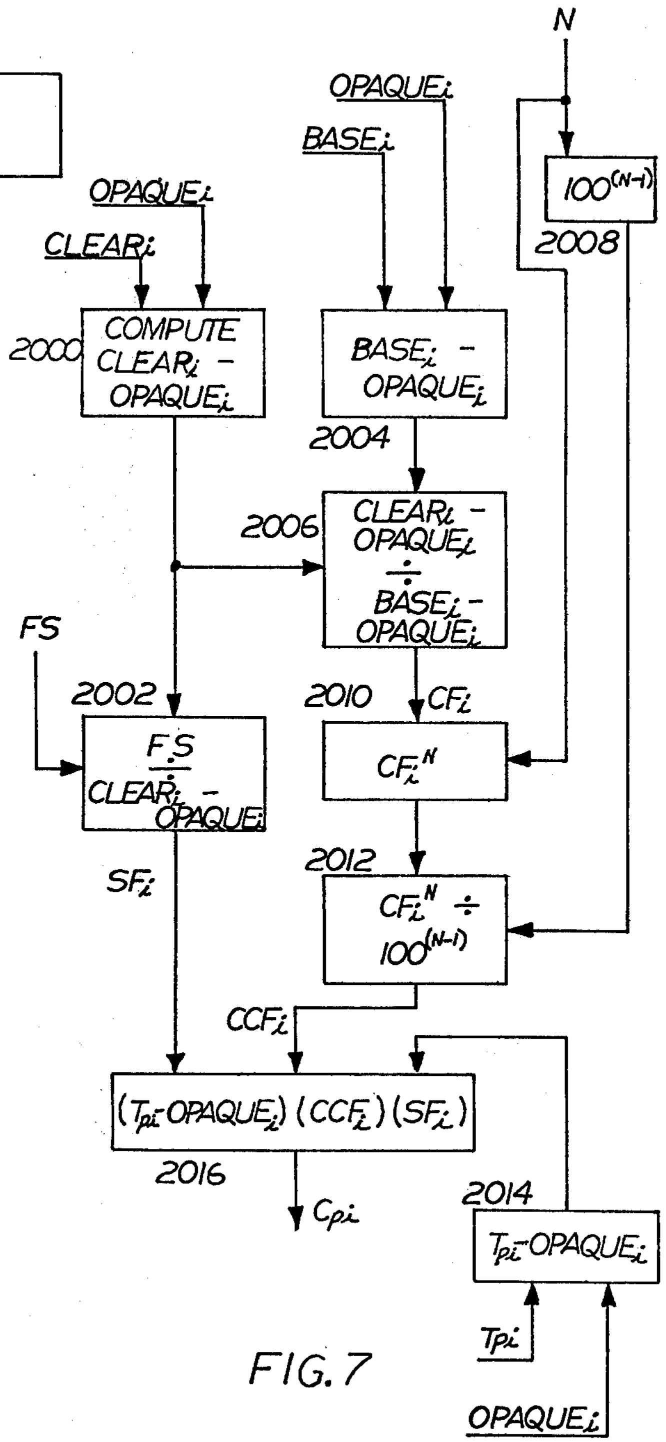
FIG. 7 is a flow chart of the operation of a microprocessor in calibrating and normalizing the light transmission samples and correcting them for the number of film layers in the image member.

From these "raw" light transmission samples, the microprocessor will develop calibrated and scaled light transmission readings for each sensor for each half column by the sequence shown in FIG. 7 which is described below.

| Instruction | Procedure |
|---|---|
| 2000 | This instruction invokes a procedure whereby the clear and opaque transmission readings for each sensor i are called from memory and the difference therebetween is computed. |
| 2002 | This instruction invokes a procedure whereby the full scale system count is called from memory and is divided by the difference between the clear and opaque transmission readings for each sensor i to determine a scale factor for each sensor, $SF_i$. |
| 2004 | This instruction invokes a procedure whereby the base and opaque transmission readings for each sensor are called from memory and their difference is determined. |
| 2006 | This instruction invokes a procedure whereby the difference between the clear and opaque readings for each sensor is divided by the difference between the base and opaque reading for the same sensor to determine a calibration factor $CF_i$ for each sensor. |
| 2008 | This instruction invokes a procedure whereby the number of layers, N, in the film being analyzed is obtained from the control panel and the indicated computation is performed. |
| 2010 | This instruction invokes a procedure whereby the calibration factor for each sensor $CF_i$ is raised to the N power. |
| 2012 | This instruction invokes a procedure whereby a corrected calibration factor for each sensor, $CCF_i$ is computed to correct the calibration factor for the number of film layers, N. |
| 2014 | This instruction invokes a procedure whereby each light transmission sample for each sensor $I_{pi}$ and each opaque calibration sample are called from memory and their difference computed. |
| 2016 | This instruction invokes a procedure whereby each transmission reading for each sensor $T_{pi}$ is calibrated and scaled to obtain a calibrated and scaled transmission reading $C_{pi}$. |

Figure 8:
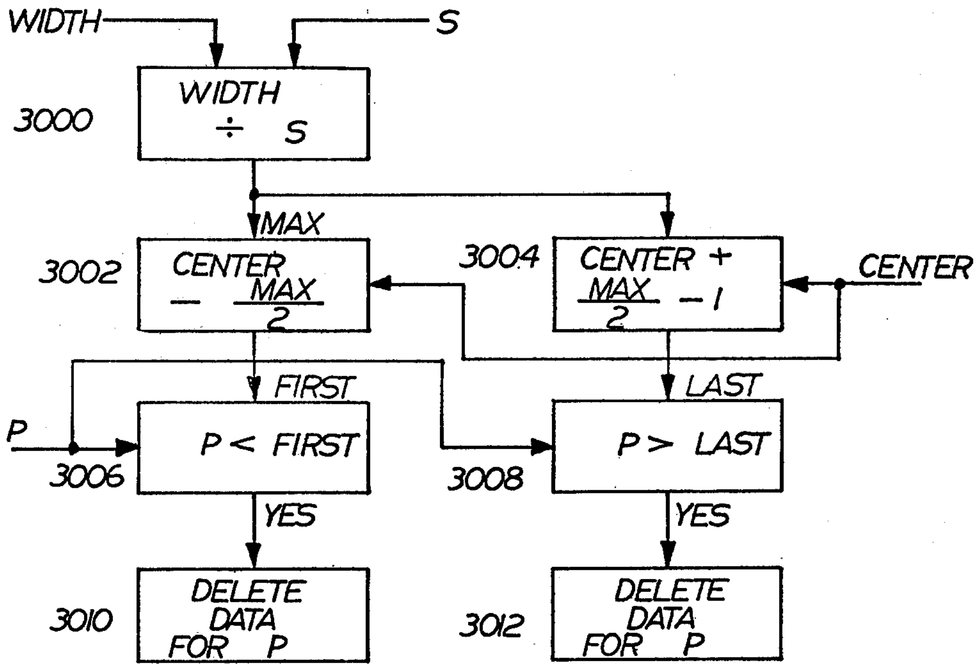
FIG. 8 is a flow chart of the operation of a microprocessor in determining the ink key half columns which are outside the web to be employed for printing and deleting the data for those columns.

At the end of the sequence described above there is stored in working memory 185 a calibrated and scaled transmission reading for each "raw" transmission reading taken during the scan of scanner assembly 15 across support surface 13. In many cases there will be page positions on the analyzed film which contain no image that is to be printed. In the same or other cases a web having less than a full width may be employed for printing. In these cases switches **25*d* and 25*f* on control panel 25 indicate the page positions selected and the web width to be employed. The data for those ink key half columns which will not be utilized in printing an image on the film analyzed may be discarded. A sequence for determining those ink key half columns which lie outside the web to be employed and deleting their data is shown in FIG. 8** and described below.

| Instruction | Procedure |
|---|---|
| 3000 | This instruction invokes a procedure whereby the maximum number of ink key half columns occupied by a web having indicated width, MAX, is determined as a function of the web width and a quantity S, where S is the ink key half column spacing. |
| 3002 | This instruction invokes a procedure whereby the number of the first ink key half column covered by the web, First, is determined from the number of the center ink key half column, Center, (in FIG. 4, Center = 21) and Max. |
| 3004 | This instruction invokes a procedure whereby the number of the last ink key half column covered by the web, Last, is determined from Center and Max. |
| 3006 | This instruction invokes a procedure whereby the number P of each ink key half column is compared to First to determine whether or not P lies outside the web. |
| 3008 | This instruction invokes a procedure whereby the number P of each ink key half column is compared to Last to determine if P lies outside the web. |
| 3010 | This instruction invokes a procedure whereby the data for all ink key half columns P lying outside First are deleted. |
| 3012 | This instruction invokes a procedure whereby the data for all ink key half columns P lying outside Last are deleted. |

As a result of the procedures illustrated above in FIG. 8, data for those half columns which lie outside the selected web width are set to zero.

Figure 9A:
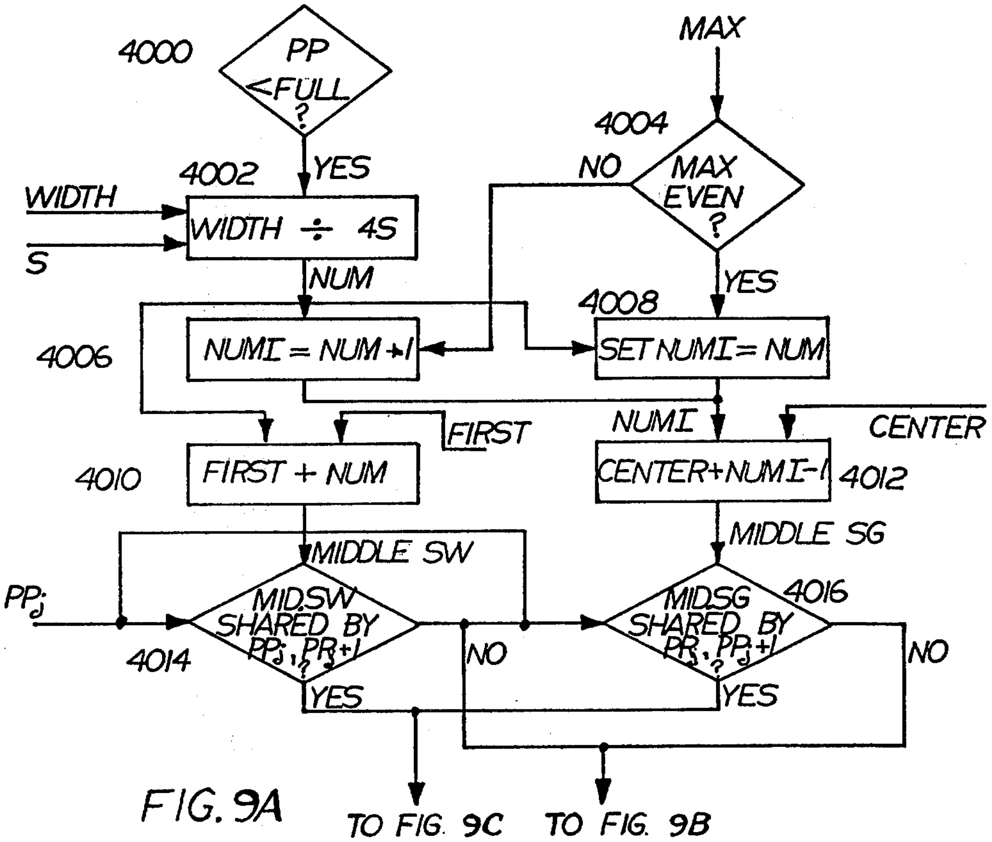

As mentioned above, in some cases it will not be desired to print all of the image present on the film being analyzed. In those cases the page positions on the film which do not contain image to be printed will not be selected on the control panel. The half columns occupied by the non-selected page positions can then be determined and the data therefrom deleted. A program sequence for determining the half columns included in the non-selected page positions and deleting the data therein is illustrated in FIGS. 9A to 9C and described below.

| Instruction | Procedure |
| --- | --- |
| 4000 | This instruction invokes a procedure whereby the "Full" position switch 25e is interrogated to determine if less than all of the page positions of the film being analyzed are to be printed. |
| 4002 | This instruction invokes a procedure whereby the number of half columns per page position, NUM, is determined from the web width, Width, and the ink key half column spacing S. |
| 4004 | This instruction invokes a procedure whereby it is determined whether Max, the maximum number of ink key half columns covered by the web, is an even or odd number. |
| 4006 | This instruction invokes a procedure whereby NUMI, the number of half columns per page position with a shared half column, is determined from NUM if Max is not an even number. |
| 4008 | This instruction invokes a procedure whereby NUMI is set equal to NUM if Max is an even number. |
| 4010 | This instruction invokes a procedure whereby the number of the center column on the work side half web, Middle SW, is calculated as the sum of NUM and First. |
| 4012 | This instruction invokes a procedure whereby the number of the center column on the gear side half web, Middle SG, is determined from the number of the center ink key half column on the entire web, Center, and the number of columns per page position with a shared column, NUMI. |
| 4014 | This instruction invokes a procedure whereby it is determined whether Middle SW is shared by any two page positions, $PP_j$, $PP_{j+l}$. |
| 4016 | This instruction invokes a procedure whereby it is determined whether Middle SG is shared by any two page positions, $PP_j$, $PP_{j+l}$. |
| 5000–5006 | These instructions invoke a procedure whereby the number of each half column P, is tested to determine if the half column lies between First and Middle SW and any such half column P which lies in a page position $PP_j$ not selected by switches 25d has its transmission data set to zero. |
| 5008–5014 | These instructions invoke a procedure whereby the number of each half column, P is tested to determine if the half column lies between Middle SW+1 and Center and any such half column P which lies in a page position $PP_j$ not selected has its transmission data set to zero. |
| 5016–5022 | These instructions invoke a procedure whereby the number of each half column P is tested to determine if it lies between Center and Middle SG and any such half column P which lies in a page position $PP_j$ not selected has its transmission data set to zero. |
| 5024–5030 | These instructions invoke a procedure whereby the number of each half column P is tested to determine if it lies between Middle SG+1 and Last and any such half column P which lies in a page position $PP_j$ not selected has its light transmission data set to zero. |

Figure 9B:
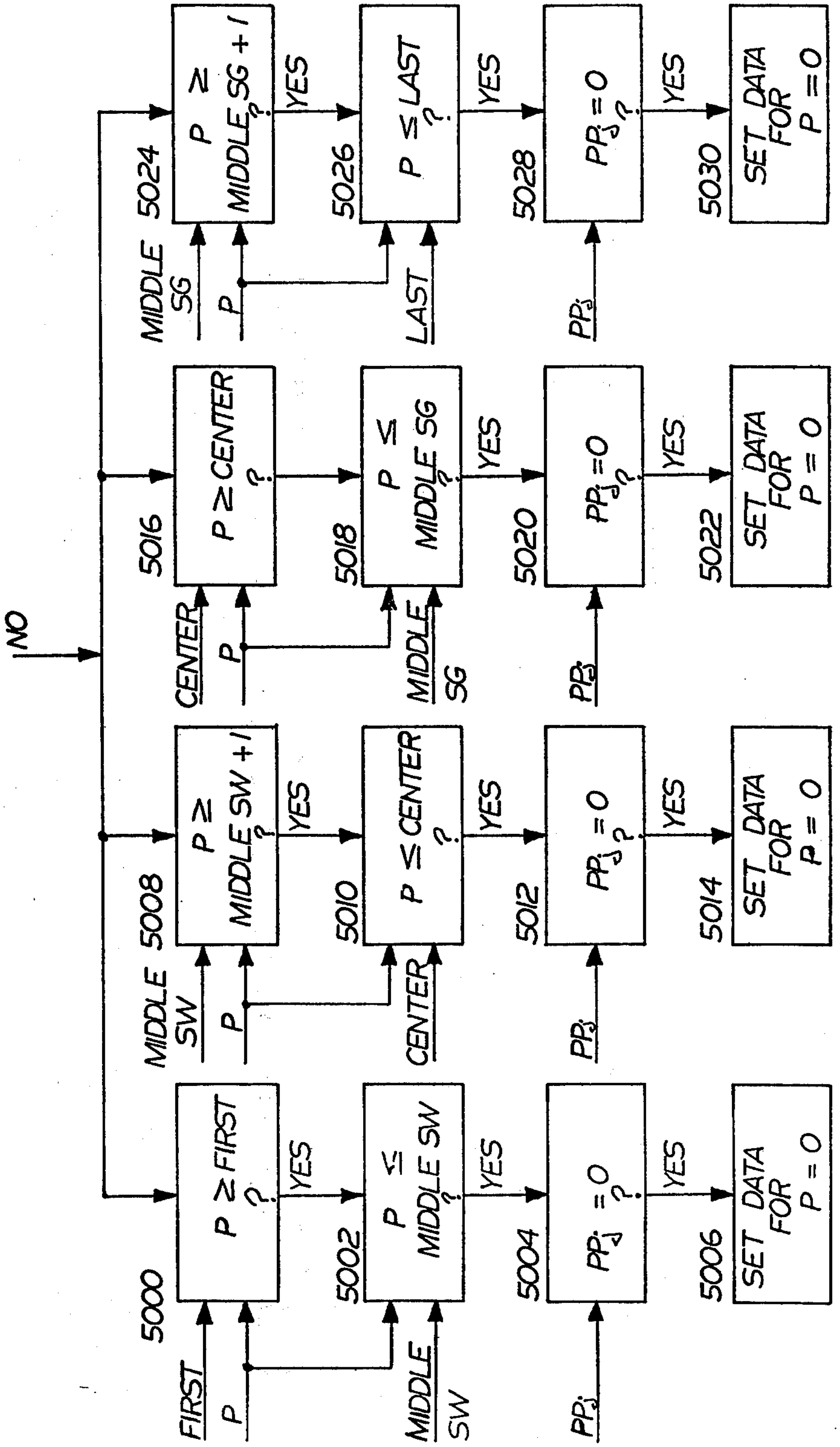

In the case in which the center half column on the work side half web, Middle SW, and on the gear side half web, Middle SG, are shared by two page positions the program sequence is the same as that shown in FIG. 9B with an exception for each of the Middle SW and Middle SG half columns. The exception is illustrated in FIG. 9C for the Middle SW half column and the same procedure is applied for the Middle SG half column.

As shown in FIG. 9C, the number of each half column P if determined to be not less than the number of Middle SW by instruction 6000 is tested at instruction 6002 to determine if it is equal to Middle SW. If so, and if both page positions $PP_j$ and $PP_{j+1}$ on the same side (work side or gear side) of the web have not been selected then the data for the half column is set to zero, all as illustrated for instructions 6002 to 6008. Otherwise, the half column Middle SW always contains data which will be utilized.

The same procedure is followed for determining whether or not to zero the data for Middle SG, the center half column on the gear side of the web.

At the end of the program sequences of FIGS. 6 to 9C there remains stored in memory a calibrated and scaled light transmission reading for each sensor for each half column which will be utilized in printing the image analyzed. If the readings represent data from a positive film they may be converted into negative film values by subtracting each reading from the system full scale value. The sensor readings for each half column may then be summed and the two half column sums for each ink key column summed to provide an image area value for each ink key column. The value for each column may be stored and later provided as an input to additional apparatus for determining and making initial ink key settings on the press.

As mentioned above, the present invention also provides a method whereby correction may be made for extraneous non-image material appearing on the film being analyzed. More particularly, any extraneous markings such as, for example, grease pencil identification markings on the film affect the transmission of light through the film and would introduce an error into the data taken and corrected as described above. According to the invention, however, any error introduced into the data by such non-image material is corrected by subtracting from the image area value for each column affected by the non-image material the error introduced by the extraneous material.

Referring to FIG. 10A, the block 200 represents the image area and the marking 202 extraneous material, part of eacy lying within the ink key column C. It is apparent that if data for the ink key column C were taken, corrected, and summed as described above the image area value would be in error by an amount contributed by the marking 202. The data would indicate a larger image area within the column C than is actually the case. The effect of the extraneous material 202 can be removed by first making an opaque mask 205 of the image 200 as shown in FIG. 10B but excluding the extraneous material 202 and placing the mask in the same position on support surface 13. Data is then taken, corrected, and summed for each ink key column as described above. The data for column C would indicate a perfectly opaque image of the same area as the image 200 less the extraneous material 202.

The original film containing the image area 200 and the extraneous material 202 is then placed over the opaque mask 205 as shown in FIG. 10C and data is again taken, corrected, and summed in the manner described above. The resulting data for ink key column C will be the sum of the data taken for the step of FIG. 10B plus the effect of the extraneous material 202. The effect of the extraneous material can then be removed by subtracting the absolute value of the corrected and summed information taken in the step of FIG. 10B from the absolute value of the corrected and summed information taken in the step of FIG. 10C and then subtracting this difference from the information obtained in FIG. 10A. The result will be deletion of the effect of the extraneous material 202.

Figure 11:
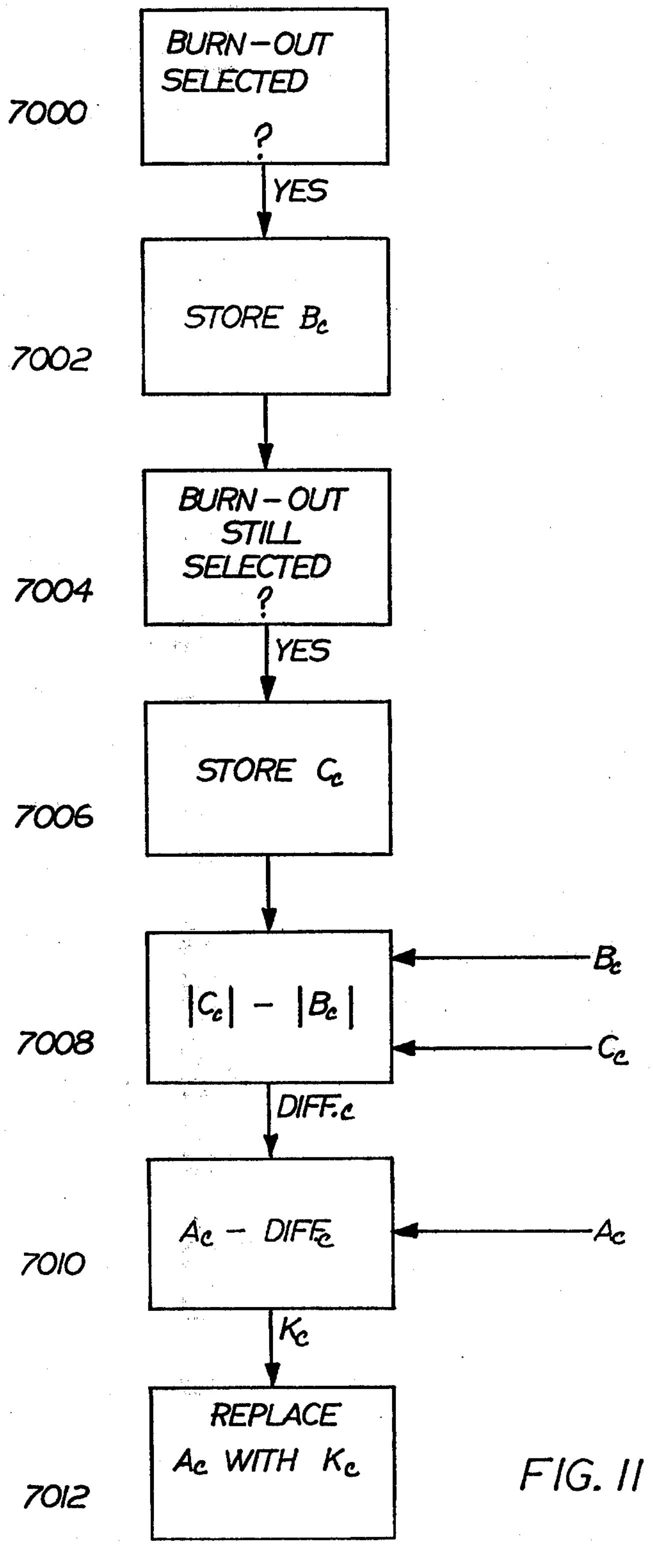
FIG. 11 is a flow chart of the operation of a microprocessor in handling the image area values in the procedure of FIGS. 10A to 10C.

The procedure is selected by operating "burn out" switch 25*g* on control panel 25. A program sequence for handling the image area values in the "burn out" procedure is illustrated in FIG. 11 and described below.

| Instruction | Description |
| --- | --- |
| 7000 | This instruction invokes a procedure whereby "burn-out" switch 25g is interrogated to determine if it is operated. |
| 7002 | This instruction invokes a procedure whereby the column image area values $B_c$ for a first scan taken with the "burn-out" switch operated are stored. |
| 7004 | This instruction invokes a procedure whereby the column "burn-out" switch is again interrogated. |
| 7006 | This instruction invokes a procedure whereby the column image area values $C_c$ for a second scan taken with the "burn-out" switch operated are stored. |
| 7008 | This instruction invokes a procedure whereby the absolute value of $C_c$ is subtracted from the absolute value of $B_c$ to obtain $Diff_c$. |
| 7010 | This instruction invokes a procedure whereby $Diff_c$ is subtracted from $A_c$, the column image area values obtained for the same film prior to operation of the "burn-out" switch, to obtain $K_c$. |
| 7012 | This instruction invokes a procedure whereby each $A_c$ is replaced by the corresponding $K_c$. |

It will be apparent from the foregoing that instruction 7002 is for storing the values obtained from the step of FIG. 10B and instruction 7006 is for storing the values from the step of FIG. 10C. The computations are performed per intructions 7008 and 7010.

We claim:

1. A method for determining the relative image area in a column of an image member having image and non-image material thereon and divided into ink key columns corresponding to those in which ink is controlled in a printing cylinder comprising the steps of directing light on said image member, obtaining first data representative of the amount of light from a column of said image member having image and non-image material therein, obtaining second data indicating the amount of light received from an opaque image of the area of the image material in said column, obtaining third data indicating the amount of light received from an image including an opaque image of the area of the image material in said column and including said non-image material in said column, subtracting the second data for said column from the third data for said column to obtain a difference, and subtracting said difference from said first data for said column to remove the effect of said non-image material on said first data.

2. A method as claimed in claim 1 wherein the step of directing light on said image member comprises the steps of placing said image member on a transparent support surface and directing light through said support surface and said image member.

3. A method as claimed in claim 1 wherein the step of obtaining first data includes the steps of scanning said image member, obtaining samples of the amount of light from said column having image and non-image material thereon, and utilizing said samples to obtain said first data.

4. A method as claimed in claim 1 wherein the step of obtaining second data includes the steps of replacing said image member with an opaque mask of the area of the image material alone in said column, obtaining samples of the light from said column from said mask and without said non-image material, and utilizing said samples to obtain said data.

5. A method as claimed in claim 1 wherein the step of obtaining third data includes the steps of masking the image material in said column, obtaining samples of the light from said column including said mask and said non-image material, and utilizing said samples to obtain said third data.

6. A method for determining the relative image area in a column of an image member having image and non-image material thereon and divisible into ink key columns corresponding to those in which ink is controlled in a printing cylinder, comprising the steps of obtaining a first value representative of the total area of image and non-image material in a column, obtaining a second value representative of an opaque image of the area of said image material alone, obtaining a third value representative of the area of said non-image material plus an opaque image of the area of said image material, subtracting the second value of said column from the third value for said column to obtain a difference, and subtracting said difference from said first value for said column to remove the effect of said non-image material on said first value.

* * * * *